(12) United States Patent
Liu et al.

(10) Patent No.: US 11,494,690 B2
(45) Date of Patent: Nov. 8, 2022

(54) APPARATUS AND METHOD OF HIGH DIMENSIONAL DATA ANALYSIS IN REAL-TIME

(71) Applicant: Hong Kong Applied Science and Technology Research Institute Company Limited, Hong Kong (HK)

(72) Inventors: Yang Liu, Hong Kong (HK); Kangheng Wu, Hong Kong (HK); Zhi Bin Lei, Hong Kong (HK); Vincent Wai-Leuk Tam, Hong Kong (HK); Wei Chen Huang, Hong Kong (HK); Lawrence Kwan Yeung, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 908 days.

(21) Appl. No.: 16/354,207

(22) Filed: Mar. 15, 2019

(65) Prior Publication Data
US 2020/0293945 A1    Sep. 17, 2020

(51) Int. Cl.
*G06N 20/00* (2019.01)
*G06F 16/28* (2019.01)
(Continued)

(52) U.S. Cl.
CPC ....... *G06N 20/00* (2019.01); *G06F 16/24568* (2019.01); *G06F 16/283* (2019.01); *G06F 16/285* (2019.01); *G06N 5/04* (2013.01)

(58) Field of Classification Search
CPC .... G06N 20/00; G06N 5/04; G06F 16/24568; G06F 16/285; G06F 16/283
See application file for complete search history.

(56) References Cited

U.S. PATENT DOCUMENTS 7,777,743 B2 * 8/2010 Pao .................. G06K 9/6232
                                                        345/428
9,280,517 B2 * 3/2016 Liu .................... G06F 17/10
(Continued)

FOREIGN PATENT DOCUMENTS

CN      106951680 A     7/2017
CN      107292323 A     10/2017
(Continued)

OTHER PUBLICATIONS

International Search Report of corresponding PCT Patent Application No. PCT/CN2019/078584 dated Oct. 17, 2019.

*Primary Examiner* — Hares Jami
(74) *Attorney, Agent, or Firm* — Idea Intellectual Limited; Margaret A. Burke; Sam T. Yip (57) ABSTRACT

A method of high dimensional data analysis in real-time comprising executing dimension-reducing an input historical data set under a t-SNE model and determining from the resulting dimension-reduced data set a recent; further dimension-reducing the recent group data set under a PCA model; statistical analyzing the further dimension-reduced data set to determine a threshold group for distinguishing abnormal data from normal ones in a real-time data stream. The method may further include training a classifier using the abnormal or normal data set for predicting anomaly in the real-time data source system. Alternatively, a discrepancy training data set is computed from one of the normal and abnormal data sets and be used to train one of independent normal and abnormal data regression models; with the other one trained by transfer learning based on the trained one. The trained regression models are then used to predict discrepancy values.

14 Claims, 7 Drawing Sheets

(51) Int. Cl.
 *G06N 5/04* (2006.01)
 *G06F 16/2455* (2019.01)

(56) References Cited

U.S. PATENT DOCUMENTS

| | | | |
|---|---|---|---|
| 9,942,085 B2 | 4/2018 | Tsagkaris et al. | |
| 2007/0088534 A1* | 4/2007 | MacArthur | G05B 17/02 |
| | | | 703/17 |
| 2009/0327989 A1 | 12/2009 | Zhuoxiang | |
| 2013/0173218 A1* | 7/2013 | Maeda | G06Q 10/20 |
| | | | 702/182 |
| 2013/0346594 A1* | 12/2013 | Banerjee | G06F 11/3495 |
| | | | 709/224 |
| 2017/0176956 A1 | 6/2017 | Fusi et al. | |
| 2018/0024875 A1* | 1/2018 | Della Corte | G06F 11/3452 |
| | | | 714/37 |
| 2019/0098039 A1* | 3/2019 | Gates | G16H 50/70 |
| 2019/0155672 A1* | 5/2019 | Wang | G06K 9/00536 |
| 2020/0099708 A1* | 3/2020 | Mathews | G06N 20/00 |

FOREIGN PATENT DOCUMENTS

| | | | | |
|---|---|---|---|---|
| CN | 108427966 A | | 8/2018 | |
| CN | 109034140 A | * | 12/2018 | ......... G06K 9/00536 |
| WO | 2018027180 A1 | | 2/2018 | |
| WO | 2018079020 A1 | | 5/2018 | |

\* cited by examiner

| | |
|---:|---:|
| −6.30397, | −2.86062 |
| −6.85075, | −3.28431 |
| −8.10852, | −1.04887 |
| −6.89750, | −2.42849 |
| −6.63433, | −3.67336 |
| −5.49155, | 6.10277 |
| −5.31892, | −3.14129 |
| −8.07476, | −1.99645 |
| −3.93750, | 6.04915 |
| 2.96347, | −0.32945 |
| −0.26194, | 8.19943 |
| 0.95178, | −1.20827 |
| 3.38458, | −4.57288 |
| 2.47290, | −5.98687 |
| 1.00102, | 1.16894 |
| −0.36393, | 5.82411 |
| 1.25415, | −0.14120 |
| 8.27686, | 3.49124 |
| 0.86987, | 3.82330 |
| 7.39140, | 1.21528 |
| 0.64729, | 2.70841 |
| 1.05973, | 1.48060 |
| 0.67901, | 1.66924 |
| 1.00102, | 1.16894 |
| 1.67955, | 0.11352 |
| 3.59842, | −1.89234 |
| −1.63017, | 7.26283 |
| 3.95467, | −4.00000 |
| 3.48316, | −6.20394 |
| 1.71628, | −2.16831 |
| 3.04792, | −0.05050 |
| 3.65228, | −5.39638 |
| 0.92247, | −0.10428 |
| 1.20940, | 2.35845 |
| 4.44657, | −0.94838 |

APPARATUS AND METHOD OF HIGH DIMENSIONAL DATA ANALYSIS IN REAL-TIME

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to real-time analysis of data generated by Internet of Things (IoT). More particularly, the present invention relates to systems and methods of real-time data analysis of high dimensional data, and more particularly analysis for identifying data patterns associated with anomalies.

BACKGROUND OF THE INVENTION

In modern days societies, the use of sensors, cameras, and digital meters (such as water, gas, electricity, etc.) is prevalent and these devices are increasing connected to form vast networks of IoT. Such IoT networks in turn generate huge volume of data and the effective analysis of data is one of the focusing areas in building a "smart" city. For example, a typical scenario of a water supply network where many flow meters are installed to collect water flow data. The numerous meters generate high dimensional data set, where the data set having high dimension means that the data set have a high number of features in relative to its number of sample points. The analysis of high dimensional data is a time consuming and complex process that is difficult to be conducted in real-time. Moreover, system impact, such as topology change, network update, human error, etc., often brings asynchronization between the data collected and the real scenario that causes low accuracy in the data analysis.

Nonetheless, the benefits of real-time high dimensional data analysis of the IoT data is undeniable. It can help operators identify potential issues quickly to save cost, and improve safety and system efficiency. However, one of the critical factors in a successful data analysis is to identify useful data for data analysis, whether it is the useful data for training a real-time data analyzer or classifier to spot the anomalies or the subset of real-time data that can be used as basis of anomaly prediction. There is an unmet need of real-time high dimensional data analysis using techniques that can rapidly and accurately identify useful data in the high dimensional data set.

SUMMARY OF THE INVENTION

The present invention provides an apparatus and method of high dimensional data analysis in real-time that address the above-mentioned issues. In accordance to one aspect of the present invention, the provided apparatus and method comprise a filtering process that filters a data set in order to obtain a range of useful and/or stable data subset for further processing. Coupled with machine learning algorithms based on, for non-limiting examples, support vector machine (SVM), Bayes classifier, and neural network, embodiments of the present invention increases the likelihood of obtaining accurate anomaly predictions from a real-time data set.

In accordance to one embodiment, the aforesaid data filtering process comprises a first dimension reduction process executed by a first dimension reduction processor to find a recent group from an input data set, and a second dimension reduction process executed on the recent group by a second dimension reduction processor to produce a further dimension-reduced data set. In the first dimension reduction process, dimension of the input data set, which can be a historical data set, is reduced under a t-distributed stochastic neighbor embedding (t-SNE) model. The dimension-reduced input data set is then naturally clustered into groups. To determine a recent group, multiple experiments are conducted to generate multiple input historical data sets, in turn the first dimension reduction processor generates multiple sets of naturally clustered groups; and the group containing the most recent data is selected for the recent group.

The second dimension reduction process of the aforesaid filtering process produces the further dimension-reduced data set from the recent group under Principle Component Analysis (PCA) model. In the succeeding data analysis process, the further dimension-reduced data set is analyzed by one or more known data statistical methods to find a threshold group comprising one or more of a maximum value, a minimum value, a mean value, a standard deviation value, and a maximum occurrence frequency. During runtime, abnormal data is distinguished from normal ones in the real-time data stream using the threshold group.

In one embodiment, the normal data and abnormal data identified from the real-time data stream are used as training data to train a classifier to detect anomalies in the real-time data source system. In another embodiment, the normal data and abnormal data identified from the real-time data stream are further analyzed to obtain a normal discrepancy data set and an abnormal discrepancy data set used to train two independent regression models to each predicts a discrepancy value at a particular future point of time. The predicted discrepancy values can then be used for comparison with an actual discrepancy value obtained at that particular future point of time to identify any anomaly in the real-time data source system (e.g. if the actual discrepancy value is closer to the predicted discrepancy value by the abnormal discrepancy regression model than to the predicted discrepancy value by the normal discrepancy regression model, then there is an anomaly in the real-time data source system).

BRIEF DESCRIPTION OF THE DRAWINGS

Embodiments of the invention are described in more detail hereinafter with reference to the drawings, in which.

DETAILED DESCRIPTION

In the following description, apparatuses and methods of high dimensional data analysis in real-time, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Dimension refers to the number of features (e.g. attributes, independent variables, and explanatory variables) in the data set. And high dimensional data means that the number of dimensions is relatively high in comparison to the number of data points or instances in the data set. Various embodiments of the present invention achieve the rapid analysis of high dimensional data by incorporating techniques of reducing the number of dimensions in the data set.

Figure 1:
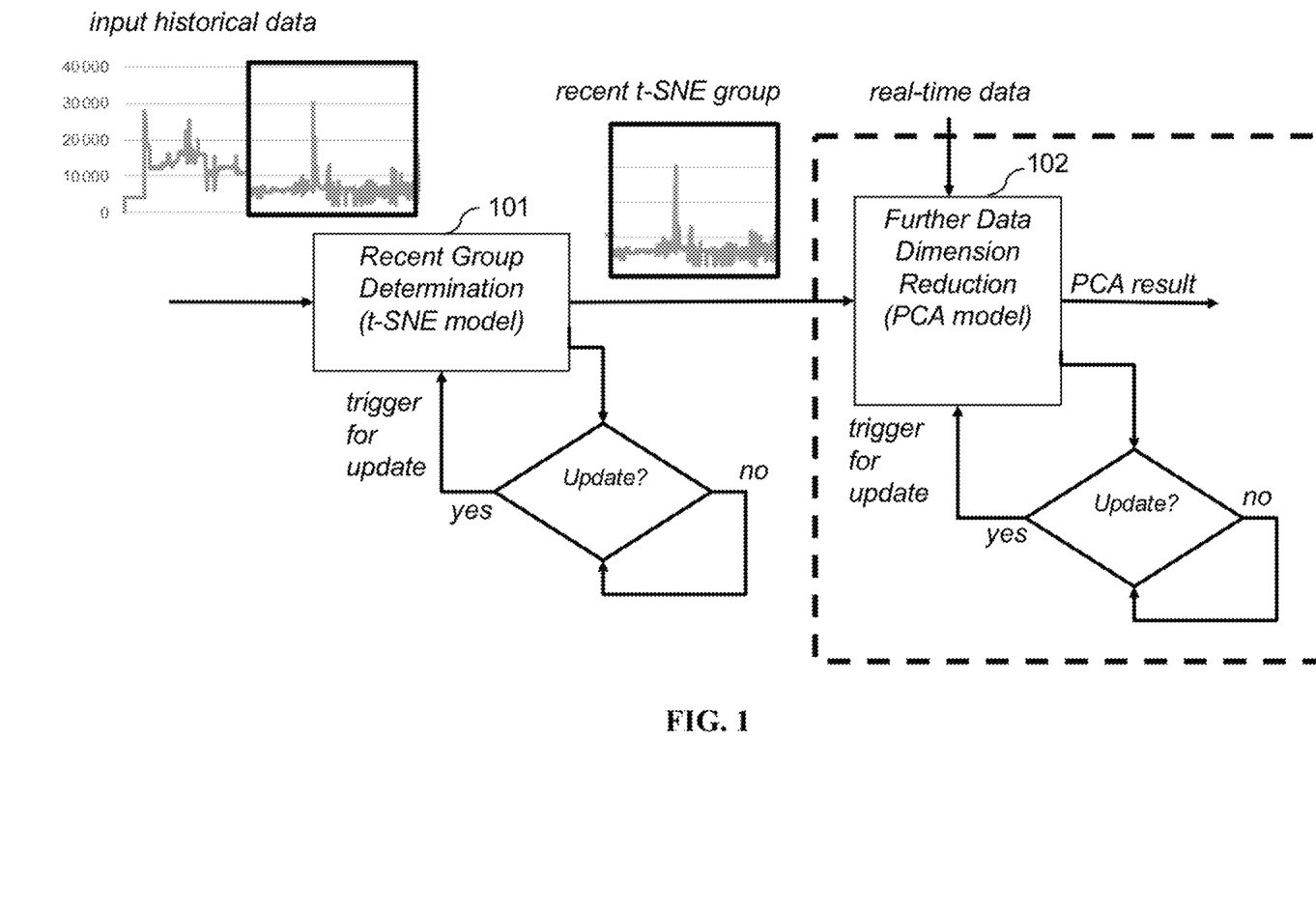
FIG. 1 depicts a logical block and data flow diagram of a data dimension reduction process in accordance to one aspect of the present invention.

Referring to FIG. 1. In accordance to one aspect of the present invention, the methods and apparatuses provided comprise one or both of a first dimension reduction process and a second dimension reduction process. The first dimension reduction process comprises a first dimension reduction processor (101) comprising a t-distributed stochastic neighbor embedding (t-SNE) model for generating a dimension-reduced data set from an input historical data set. The dimension-reduced data set is then clustered into naturally clustered groups. To determine a recent group, multiple experiments are conducted to generate multiple input historical data sets, in turn the first dimension reduction processor (101) generates multiple sets of naturally clustered groups; and the recent group is the group containing the most recent data in the multiple sets of naturally clustered groups.

Alternatively, the recent group is the one naturally clustered group with the smallest loss function value. The determined recent group is then fed to the second dimension reduction processor (102). The second dimension reduction processor (102) executes a Principle Component Analysis (PCA) for further reducing the dimension of the recent group data set to generate a set of PCA parameters for distinguishing abnormal data from normal ones in the real-time data stream.

The t-SNE is an algorithm known in the art of data analysis for dimension reduction. It uses non-linear compression to cast high dimensional data set into low dimensional space. In an exemplary embodiment, the historical data input to the first dimension reduction processor (101) is an (N, T) data set where N is the number of dimensions in the data set and T is the time information.

The t-SNE processing in the first dimension reduction processor (101) generates an (M, T) data set where M is number of reduced dimensions and M«N. In practical scenarios, N may be several hundreds or thousands and M may be two or three. After the processing by a t-SNE model in first dimension reduction processor (101), data in the generated (M, T) data set are grouped by time. It can generally be viewed that the groups capture the big events happened in time domain for the whole system of the data source. The t-SNE model can be updated periodically (e.g. weekly, monthly, quarterly) or on demand (e.g. when a major topology change occurred in the real-time data source system) with new input data sets to generate new recent groups.

Figure 2:
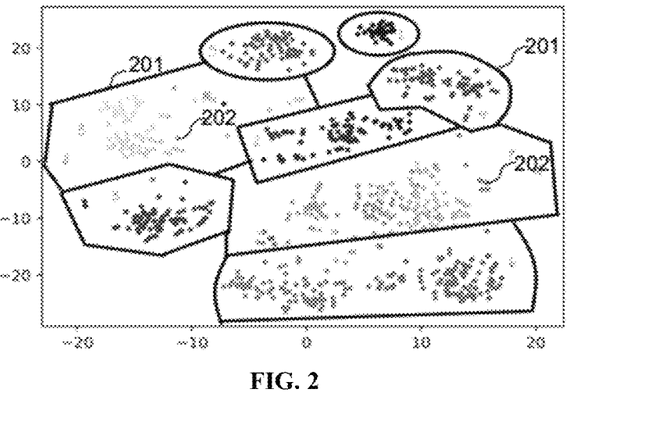
FIG. 2 depicts a data chart of dimension-reduced input historical data set collected from an exemplary network of water flow meters.

To illustrate the embodiments of the present invention, an exemplary implementation of one embodiment of the present invention on a network of water flow meters is used. FIG. 2 shows a data chart of dimension-reduced (by the t-SNE model) input historical data set collected from such network of water flow meters. Each of the naturally clustered groups (201) includes the water flow data from all meters within a time period, and each point (202) being the water flow data from all meters within at instance (or short period) of time (e.g. one day).

Figure 3:
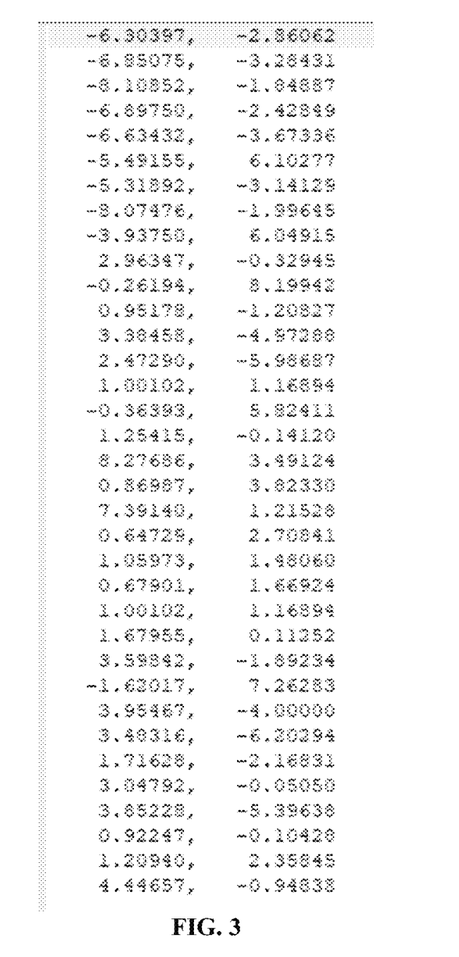
FIG. 3 lists the data values of further dimension-reduced data set collected from the exemplary network of water flow meters.

PCA is a statistical procedure known in the art of data analysis also for dimension reduction. It uses linear compression to cast high dimensional data set into low dimension space. The second dimension reduction processor (102) uses a PCA model to reduce the dimensions of the recent group generated by the first dimension reduction processor (101). To illustrate with the exemplary network of water flow meters that produced the data chart of dimension-reduced input historical data set in FIG. 2, every meter's data (number of each meter's data is K, that is, K-dimension) in the recent group is transformed into a L-dimensional data where L«K and L=2 in this example as shown in FIG. 3.

The PCA model further reduces the dimension of the data set in the recent group generated by the first dimension reduction processor (101) from the input historical data. From the PCA result, which contains a further dimension-reduced recent group data set, a threshold group comprising one or more of a maximum value, a minimum value, a mean value, a standard deviation, and a maximum occurrence frequency is defined by one or more data statistical methods known in the art. The threshold group is used to distinguish abnormal data from normal ones in the real-time data stream and to identify anomaly in the real-time data source system. For example, an abnormal data can be defined as a data with a value that is larger than the maximum value (or the maximum value times a fixed coefficient (e.g. between 0 and 1)) or lower than the minimum value (or the minimum value times a fixed coefficient (e.g. between 0 and 1)). For another example, an abnormal data can be defined as a data with a value that deviates from the mean value more than the standard deviation (or the standard deviation times a fixed coefficient (.g. between 0 and 1)) (|data value−mean value|>coefficient*standard deviation). The PCA model can be updated periodically (e.g. weekly, monthly, quarterly) or on demand (e.g. when the PCA model is found to be underperforming or increasingly inaccurate). The update of the PCA model can be accomplished by augmenting the recent group data with the real-time data as input to the second dimension reduction processor (102).

In the aforesaid exemplary implementation on a network of water flow meters, the threshold group can be configured to be (max, min)=(2, −2); an abnormal data set can then be defined to contain those data points with both dimension values in the 2-dimensional data outside of the threshold group (e.g. >2 or <−2).

Figure 4:
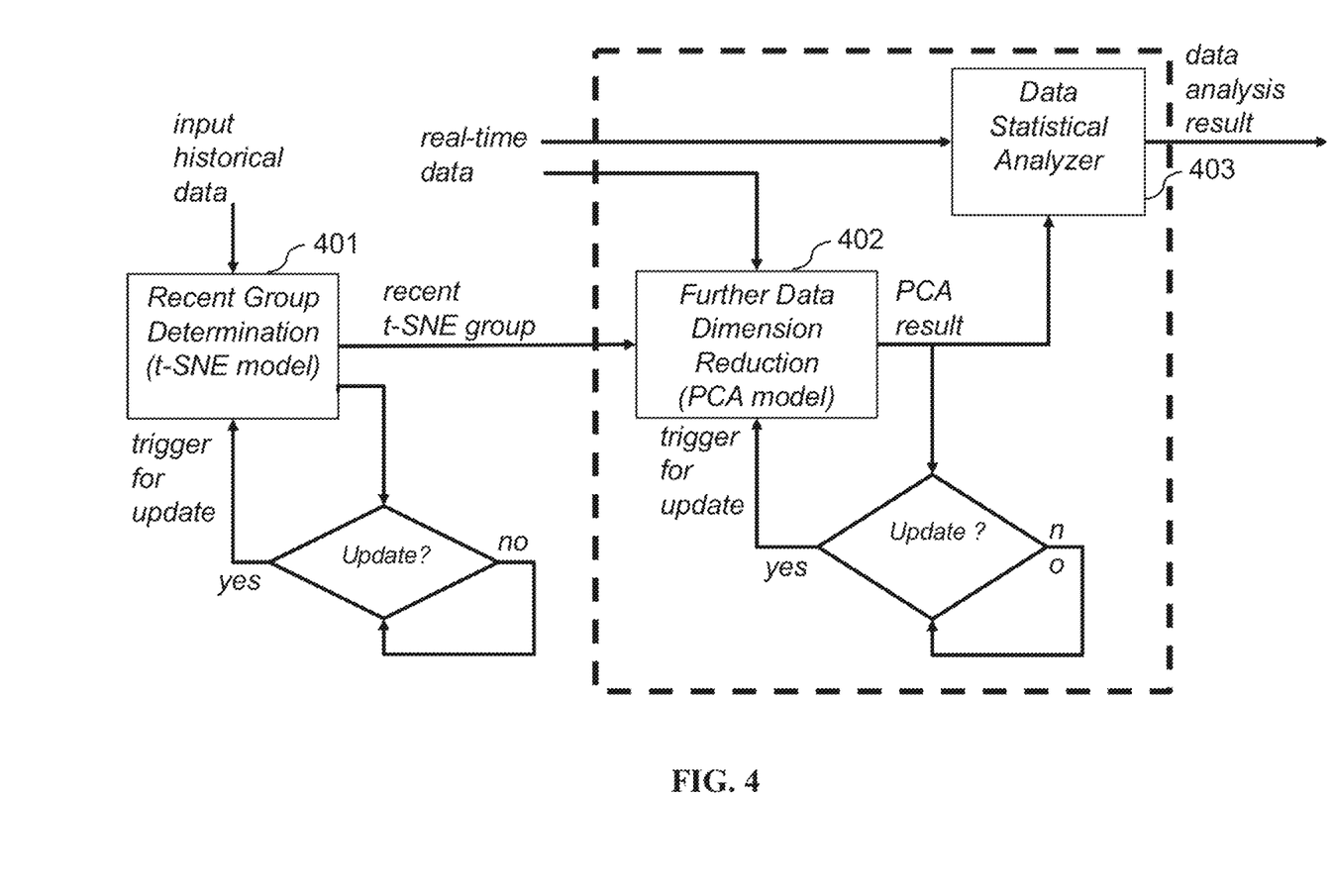
FIG. 4 depicts a logical block and data flow diagram of an apparatus and method of high dimensional data analysis in real-time in accordance to a first embodiment of the present invention.

Referring to FIG. 4. In accordance to a first embodiment, provided are an apparatus and method of high dimensional data analysis comprising a first dimension reduction process executed by a first dimension reduction processor (401), a second dimension reduction process executed by a second dimension reduction processor (402), and a data statistical analysis process executed by a data statistical analyzer (403). The first dimension reduction process comprises a first dimension reduction processor (101) comprising a t-distributed stochastic neighbor embedding (t-SNE) model for generating a dimension-reduced data set from an input historical data set. The dimension-reduced data set is then clustered into naturally clustered groups. To determine a recent group, multiple experiments are conducted to generate multiple input historical data sets, in turn the first dimension reduction processor generates multiple sets of naturally clustered groups; and the recent group is the group containing the most recent data.

Alternatively, the recent group is the one naturally clustered group with the smallest loss function value. The determined recent group is then fed to the second dimension reduction processor (402). The second dimension reduction process is based on a PCA model executed by the second dimension reduction processor (402) to further reduce the dimension of the data in the recent group to generate the PCA result, which contains a further dimension-reduced recent group data set.

The PCA result data set is then input to a data statistical analysis process executed by a data statistical analyzer (403). The data statistical analyzer (403) executes one or more of known data statistical methods on the PCA result data set to define a threshold group comprising one or more of a maximum value, a minimum value, a mean value, a standard deviation, and a maximum occurrence frequency.

Using the defined threshold group, the data statistical analyzer (403) analyzes the real-time data stream to identify anomalies in the real-time data source system by distinguishing abnormal data from normal ones, wherein the abnormal data are defined as those data having statistical values outside of the threshold group (e.g. those data values in PCA result data set that are larger than the threshold maximum value or lower than the threshold minimum value, or those data value means in PCA result data set that are outside of the threshold mean value plus standard deviation).

In the aforesaid exemplary implementation of the present invention on a network of water flow meters, the threshold group comprises a maximum value, a minimum value, and a maximum occurrence frequency such that those real-time data collected from the network of water flow meters that fall outside of the maximum value and the minimum value are abnormal data, and when the abnormal data are observed more frequently (or number of times within a period of time) than the maximum occurrence frequency, an anomaly is determined by the data statistical analyzer (403).

Figure 5:
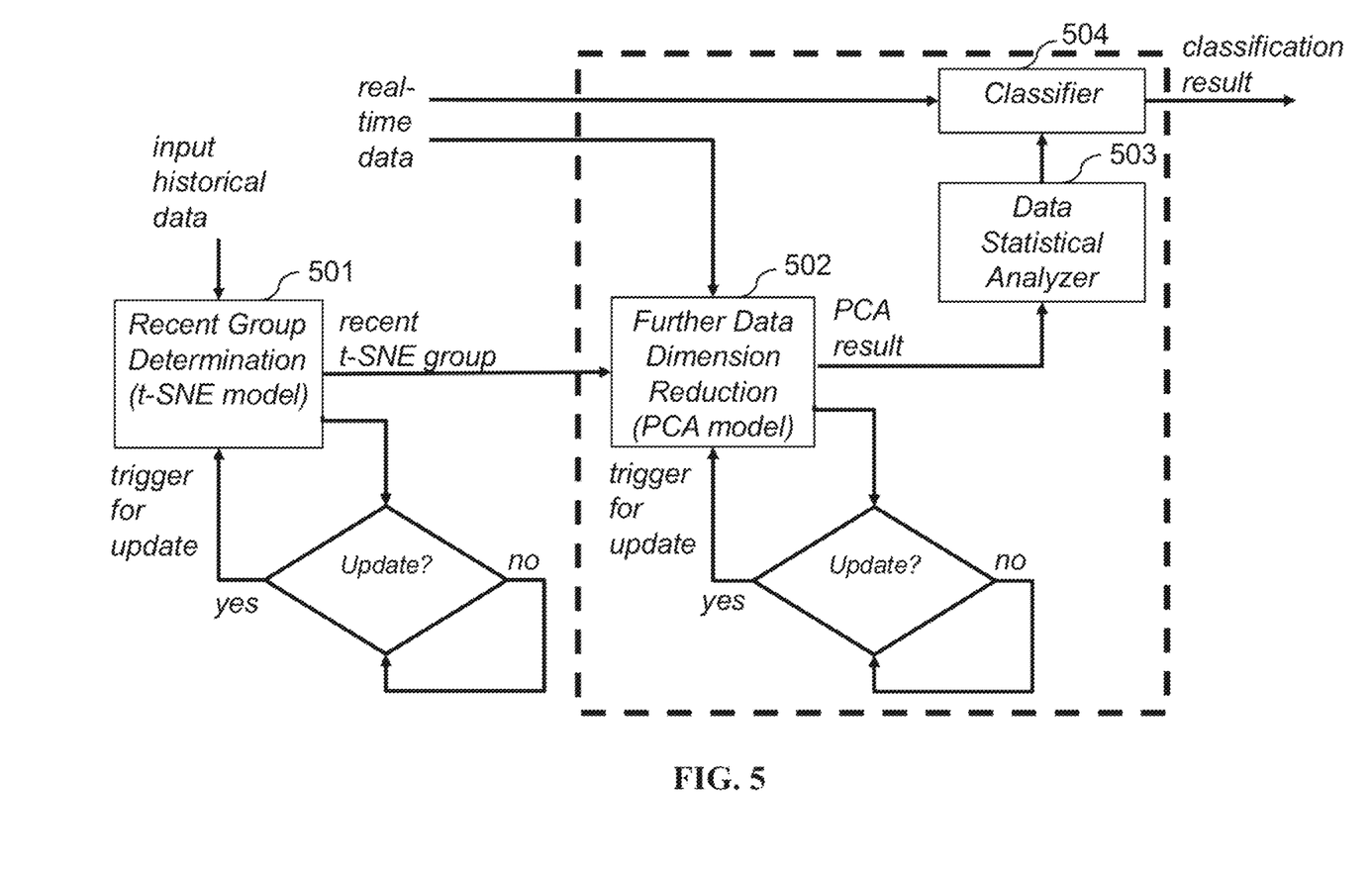
FIG. 5 depicts a logical block and data flow diagram of an apparatus and method of high dimensional data analysis in real-time in accordance to a second embodiment of the present invention.

Referring to FIG. 5. In accordance to a second embodiment, provided are an apparatus and method of high dimensional data analysis comprising a first dimension reduction process executed by a first dimension reduction processor (501), a second dimension reduction process executed by a second dimension reduction processor (502), a data statistical analysis process executed by a data statistical analyzer (503) that are identical to those in the aforesaid first embodiment. The apparatus and method of the second embodiment, however, further comprise a classification process executed by a classifier (504), wherein the classifier may be implemented by methods known in the art, such as SVM, Bayes, and neural networks.

The abnormal data set and normal data set together from the real-time data stream distinguished by the data statistical analyzer (503) is taken as a training data set (e.g. with each data having a value and a label for being normal or abnormal) for training the classifier (504). This training data set may contain high dimensional data or low dimensional data. The trained classifier (504) is then used to predict from the real-time data stream anomalies in the real-time data source system.

Figure 6:
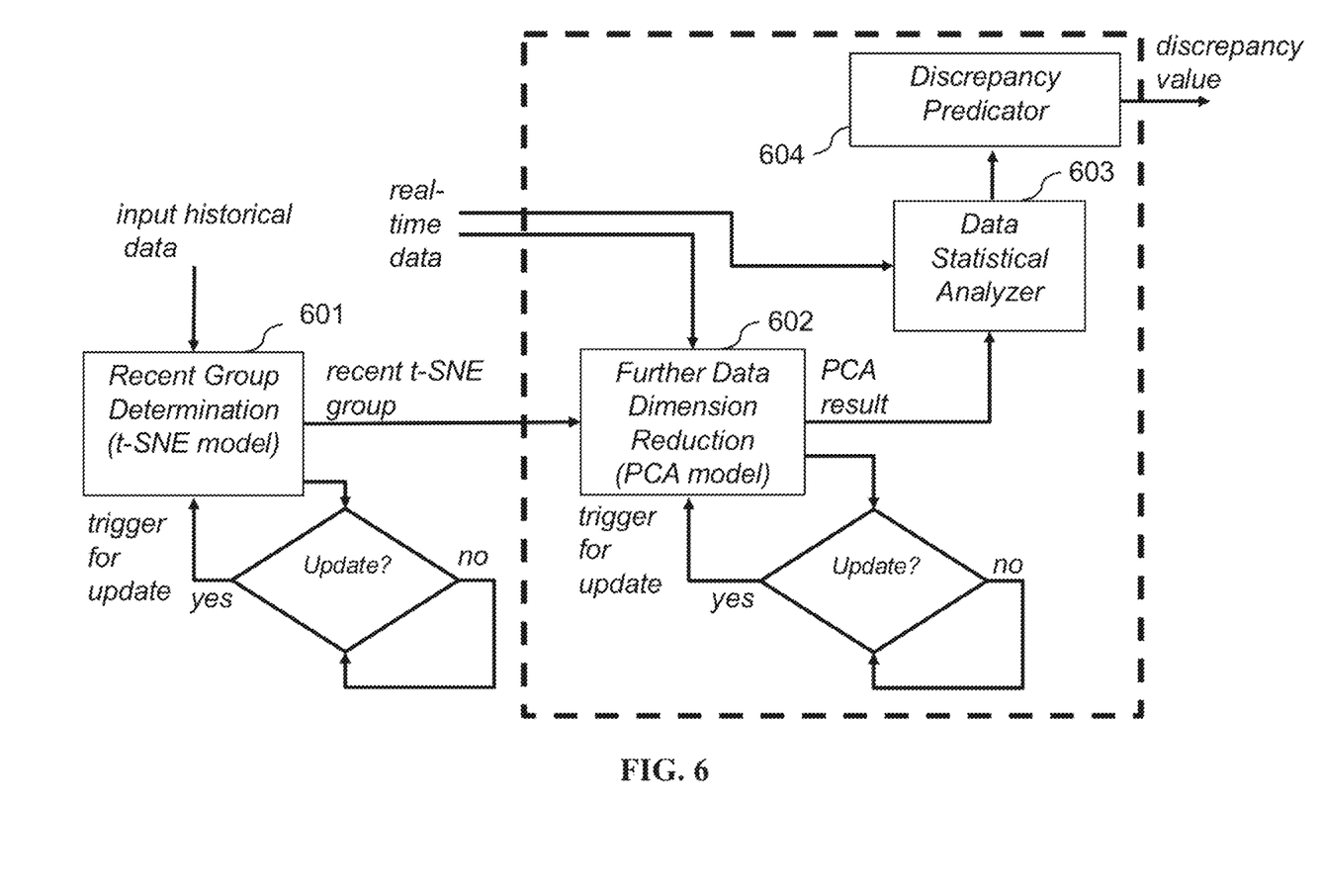
FIG. 6 depicts a logical block and data flow diagram of an apparatus and method of high dimensional data analysis in real-time in accordance to a third embodiment of the present invention.

Referring to FIG. 6. In accordance to a third embodiment, provided are an apparatus and method of high dimensional data analysis comprising a first dimension reduction process executed by a first dimension reduction processor (601), and a second dimension reduction process executed by a second dimension reduction processor (602) that are identical to those in the aforesaid first embodiment.

The apparatus and method of the third embodiment, however, further comprise a data statistical analysis process executed by a data statistical analyzer (603) that executes one or more of known data statistical methods on the PCA result data set to define a threshold group comprising one or more of a maximum value, a minimum value, a mean value, a standard deviation, and a maximum occurrence frequency; and uses the defined threshold group to analyze the real-time data stream to distinguish real-time abnormal data from normal ones in the real-time data stream, wherein the real-time abnormal data are defined as those data having statistical values outside of the threshold group.

In addition, the data statistical analyzer (603) executes one or more of known data statistical methods on the abnormal data set and the normal data set to generate an abnormal discrepancy training data set and a normal discrepancy training data set, wherein the abnormal discrepancy training data set contains identified discrepancies in the abnormal data set and time information of occurrences of the discrepancies, and normal discrepancy training data set contains identified discrepancies in the normal data set and time information of occurrences of the discrepancies.

The apparatus and method of the third embodiment further comprise a discrepancy predictor (604) configured to train and execute two independent machine-learning regression models to predict a discrepancy value, wherein the training of the regression models optionally incorporates a transfer learning process.

In general, discrepancy can be defined as the difference between two data sets. Taking the aforesaid exemplary network of water flow meters as an illustrative example, a discrepancy can be defined as the difference in the measure water flow volumes between inflow and outflow through a meter, and a discrepancy value is predicted from the water flow meter data collected. The discrepancy value is indicative of any anomaly in the real-time data source system.

Figure 7:
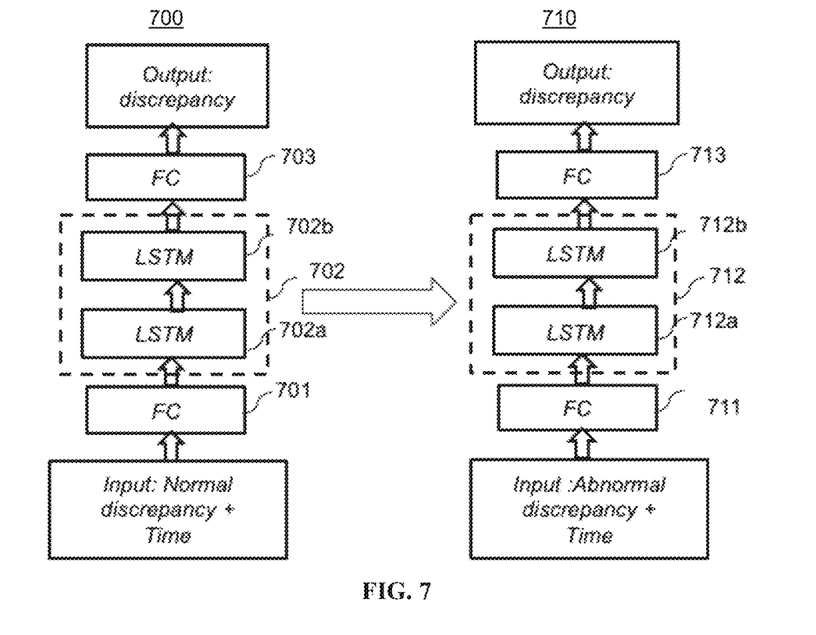
FIG. 7 depicts a logical diagram of the neural network stacks incorporating a transfer learning process in accordance to one aspect of the third embodiment of the present invention.

FIG. 7 depicts a logical diagram of the neural network stacks (700) and (710) for the normal discrepancy regression model and the abnormal discrepancy regression model respectively. The neural network stack (700) for the normal discrepancy regression model comprises a network of one or more long-short term memory (LSTM) cells (702) for classifying and making predictions based on the real-time normal discrepancy data (or the normal discrepancy training data set during training) and residing in between a first fully connected (FC) layer (701) and a second FC layer (703). The first FC layer (701) receives as input the real-time normal discrepancy data (or the normal discrepancy training data set during training) for initial processing and sends to the LSTM network (702), and the second FC layer (703) receives as input the result from the LSTM network (702) and predict a normal data discrepancy value at a particular future point of time for indication of any anomaly in the real-time data source system.

Similarly, the neural network stack (710) for the abnormal discrepancy regression model comprises a network of one or more LSTM cells (712) for classifying and making predictions based on the real-time abnormal discrepancy data (or the abnormal discrepancy training data set during training) residing in between a first FC layer (711) and a second FC layer (713). The first FC layer (711) receives as input the real-time abnormal discrepancy data (or the abnormal discrepancy training data set during training) for initial processing and sends to the LSTM network (712), and the second FC layer (713) receives as input the result from the LSTM network (712) and predicts an abnormal data discrepancy value at a particular future point of time for indication of any anomaly in the real-time data source system. The predicted discrepancy values can then be used for comparison with an actual discrepancy value obtained at that particular future point of time to identify any anomaly in the real-time data source system (e.g. if the actual discrepancy value is closer to the predicted abnormal data discrepancy value than to the predicted normal data discrepancy value, then there is an anomaly in the real-time data source system).

To expedite the training of the regression models, a transfer learning process is incorporated. In one embodiment, only the pre-trained normal discrepancy regression model is trained with normal discrepancy data set. The trained normal discrepancy regression model is then repurposed and adopted by the LSTM network (712) of the network stack (710) for the abnormal discrepancy regression model for classifying and making predictions based on the real-time abnormal discrepancy data. In another embodiment, only the pre-trained abnormal discrepancy regression model is trained with abnormal discrepancy data set. The trained abnormal discrepancy regression model is then repurposed and adopted by the LSTM network (702) of the network stack (700) for the normal discrepancy regression model for classifying and making predictions based on the real-time normal discrepancy data.

The electronic embodiments disclosed herein may be implemented using one or more computing devices, computer processors, or electronic circuitries including but not limited to application specific integrated circuits (ASIC), field programmable gate arrays (FPGA), and other programmable logic devices specially configured or programmed according to the teachings of the present disclosure. Machine instructions executing in and/or electronic circuity configurations in the computing devices, computer processors, or programmable logic devices can readily be prepared by practitioners skilled in the computer and electronic art based on the teachings of the present disclosure.

The aforesaid computing devices, computer processors, or electronic circuitries may be incorporated in one or more server computers, personal computers, laptop computers, mobile computing devices such as smartphones and tablet computers.

The electronic embodiments include transient and non-transient electronic storage media having machine instructions and/or electronic circuitry configuration data stored therein which can be used to configured computing devices, computer processors, or electronic circuitries to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method of high dimensional data analysis for distinguishing abnormal data from normal data in a real-time data stream comprising:
   executing, by a computer processor, a first dimension reduction on an input historical data set to generate a dimension-reduced data set;
   determining, by the computer processor, a recent group comprising:
      clustering data points in the dimension-reduced data set into naturally clustered groups by time of occurrences of the data points; and
      finding the recent group from the naturally clustered groups;
   executing, by the computer processor, a second dimension reduction on the recent group to generate a further dimension-reduced data set;
   determining, by the computer processor, a threshold group from the further dimension-reduced data set;
   distinguishing, by the computer processor, the abnormal data from the normal data in the real-time data stream and generating an abnormal data set of the abnormal data and a normal data set of the normal data, wherein the abnormal data are data points having values outside of the threshold group;
   performing a first training of data regression models or a second training of data regression models;
   wherein the first training of data regression models comprising:
      training an independent normal data regression model using a normal discrepancy training data set to predict a normal data discrepancy value at a future point of time; and
      training an independent abnormal data regression model by transfer learning based on the trained independent normal data regression model to predict an abnormal data discrepancy value at the future point of time;
   wherein the second training of data regression models comprising:
      training an independent abnormal data regression model using an abnormal discrepancy training data set to predict an abnormal data discrepancy value at a future point of time; and training an independent normal data regression model by transfer learning based on the trained independent abnormal data regression model to predict a normal data discrepancy value at the future point of time;

wherein the predicted discrepancy values are used to compare to an actual discrepancy value to identify anomaly in the real-time data source system at the future point of time;

wherein the trained normal data regression model comprises:
  a normal data first fully connected (FC) layer configured to receive actual normal discrepancy data in the real-time data stream for initial processing;
  a normal data neural network of one or more long-short term memory (LSTM) cells residing in between the normal data first FC layer and a normal data second FC layer, the normal data neural network is configured to receive, classify, and make predictions from output of the normal data first FC layer; and
  the normal data second FC layer configured to receive results from the normal data neural network and predict the normal data discrepancy value at the future point of time; and wherein the trained abnormal data regression model comprises:
  an abnormal data first FC layer configured to receive actual abnormal discrepancy data in the real-time data stream for initial processing;
  an abnormal data neural network of one or more LSTM cells residing in between the abnormal data first FC layer and an abnormal data second FC layer, the abnormal data neural network is configured to receive, classify, and make predictions from output of the first FC layer; and
  the abnormal data second FC layer configured to receive results from the abnormal data neural network and predict the abnormal data discrepancy value at the future point of time.

2. The method of claim 1, wherein the first dimension reduction comprising reducing data dimension of the input historical data set under a t-distributed stochastic neighbor embedding (t-SNE) model.

3. The method of claim 1, wherein the determination of the recent group comprising:
  obtaining multiple dimension-reduced data sets from multiple input historical data sets generated from multiple experiments; and
  selecting a group containing most recent data from the multiple dimension-reduced data sets as the recent group.

4. The method of claim 1, wherein the determination of the recent group comprising:
  selecting a group with a smallest loss function value from the naturally clustered groups;
  wherein the recent group is the group with the smallest loss function value.

5. The method of claim 1, wherein the second dimension reduction comprising reducing data dimension of the recent group under a Principle Component Analysis (PCA) model.

6. The method of claim 1, wherein the threshold group comprising a maximum value, a minimum value, a mean value, a standard deviation, and a maximum occurrence frequency;
  wherein point in the real-time data stream having a value larger than the maximum value or smaller than the minimum value or outside of the mean value plus the standard deviation is an abnormal data; and
  wherein an anomaly in the real-time data source system is predicted when abnormal data occurred more frequently than the maximum occurrence frequency.

7. The method of claim 1, further comprising:
  training a classifier with a combination of the abnormal data set and the normal data set;
  identifying, by the trained classifier, each of data points in the real-time data in the real-time data stream as abnormal data or normal data; and
  predicting, by the trained classifier, any anomaly in the real-time data source system.

8. A system of high dimensional data analysis for distinguishing abnormal data from normal data in a real-time data stream comprising:
  a first dimension reduction processor having at least a computer processor configured to:
    execute a first dimension reduction on an input historical data set to generate a dimension-reduced data set;
    determine a recent group comprising:
      clustering data points in the dimension-reduced data set into naturally clustered groups by time of occurrences of the data points; and
      finding the recent group from the naturally clustered groups;
  a second dimension reduction processor having at least a computer processor configured to executing a second dimension reduction on the recent group to generate a further dimension-reduced data set;
  a data statistical analyzer having at least a computer processor configured to:
    determine a threshold group from the further dimension-reduced data set; and
    distinguish abnormal data from normal data in a real-time data stream and generating an abnormal data set and a normal data set, wherein the abnormal data are data points having values outside of the threshold group;
    compute from the normal data set a normal discrepancy training data set; and
    compute from the abnormal data set an abnormal discrepancy training data set;
  a discrepancy predictor having at least a processor comprising an independent normal data regression model and an independent abnormal data regression model;
  wherein the independent normal data regression model and the independent abnormal data regression model are trained by a first training and a second training:
  wherein the first training comprising:
    training an independent normal data regression model using the normal discrepancy training data set to predict a normal data discrepancy value at a future point of time; and
    training an independent abnormal data regression model by transfer learning based on the trained independent normal data regression model to predict an abnormal data discrepancy value at the future point of time;
  wherein the second training comprising:
    training an independent abnormal data regression model using the abnormal discrepancy training data set to predict an abnormal data discrepancy value at a future point of time; and
    training an independent normal data regression model by transfer learning based on the trained independent abnormal data regression model to predict a normal data discrepancy value at the future point of time;

wherein the predicted discrepancy values are used to compare to an actual discrepancy value to identify anomaly in the real-time data source system at the future point of time;

wherein the trained normal data regression model comprises:
- a normal data first fully connected (FC) layer configured to receive actual normal discrepancy data in the real-time data stream for initial processing;
- a normal data neural network of one or more long-short term memory (LSTM) cells residing in between the normal data first FC layer and a normal data second FC layer, the normal data neural network is configured to receive, classify, and make predictions from output of the normal data first FC layer; and
- the normal data second FC layer configured to receive results from the normal data neural network and predict the normal data discrepancy value at the future point of time; and wherein the trained abnormal data regression model comprises:
- an abnormal data first FC layer configured to receive actual abnormal discrepancy data in the real-time data stream for initial processing;
- an abnormal data neural network of one or more LSTM cells residing in between the abnormal data first FC layer and an abnormal data second FC layer, the abnormal data neural network is configured to receive, classify, and make predictions from output of the first FC layer; and
- the abnormal data second FC layer configured to receive results from the abnormal data neural network and predict the abnormal data discrepancy value at the future point of time.

9. The system of claim 8, wherein the first dimension reduction processor comprising reducing data dimension of the input historical data set under a t-distributed stochastic neighbor embedding (t-SNE) model.

10. The system of claim 8, wherein the determination of the recent group comprising:
- obtaining multiple dimension-reduced data sets from multiple input historical data sets generated from multiple experiments; and
- selecting a group containing most recent data from the multiple dimension-reduced data sets as the recent group.

11. The system of claim 8, wherein the determination of the recent group comprising:
- selecting a group with a smallest loss function value from the naturally clustered groups;
- wherein the recent group is the group with the smallest loss function value.

12. The system of claim 8, wherein the second dimension reduction comprising reducing data dimension of the recent group under a Principle Component Analysis (PCA) model.

13. The system of claim 8, wherein the threshold group comprising a maximum value, a minimum value, a mean value, a standard deviation, and a maximum occurrence frequency;
- wherein point in the real-time data stream having a value larger than the maximum value or smaller than the minimum value or outside of the mean value plus the standard deviation is an abnormal data; and
- wherein an anomaly in the real-time data source system is predicted when abnormal data occurred more frequently than the maximum occurrence frequency.

14. The system of claim 8, further comprising:
- a classifier having at least a processor configured to:
- be trained with the abnormal data set, the normal data set, or a combination of the abnormal data set and the normal data set;
- identify, after training, each of data points in the real-time data in the real-time data stream as abnormal data or normal data; and
- predict, after training, any anomaly in the real-time data source system.

* * * * *